June 29, 1965     M. R. KARGE, JR     3,192,001
BEARING ASSEMBLY
Filed Oct. 24, 1962
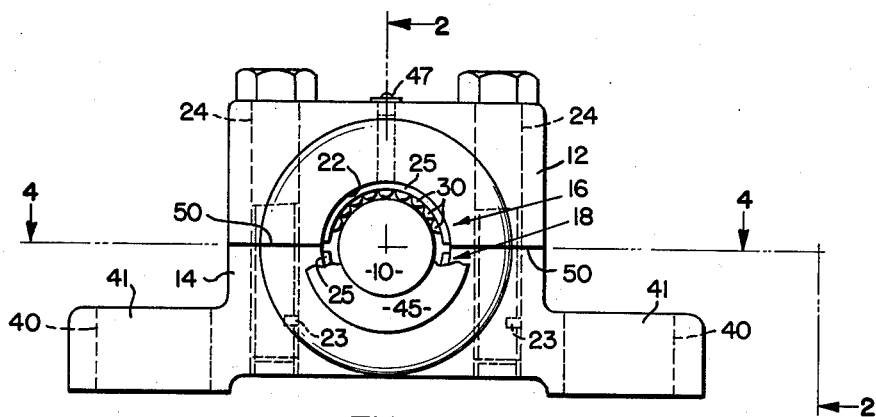
FIG. 1
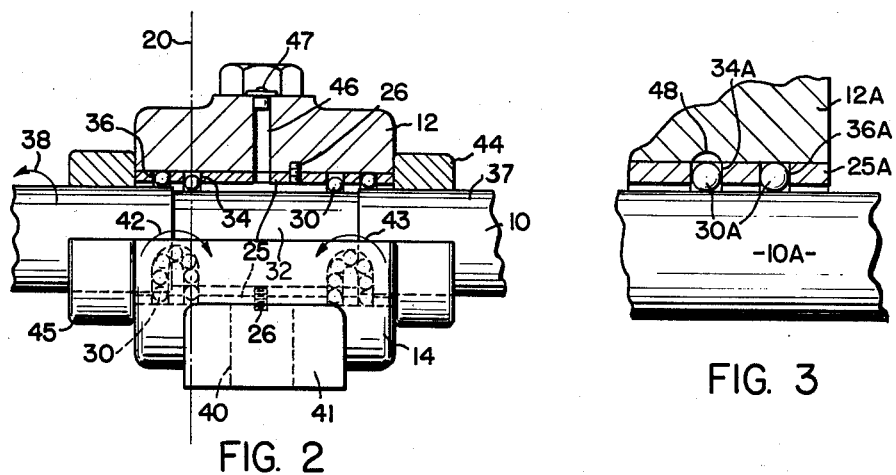
FIG. 2
FIG. 3
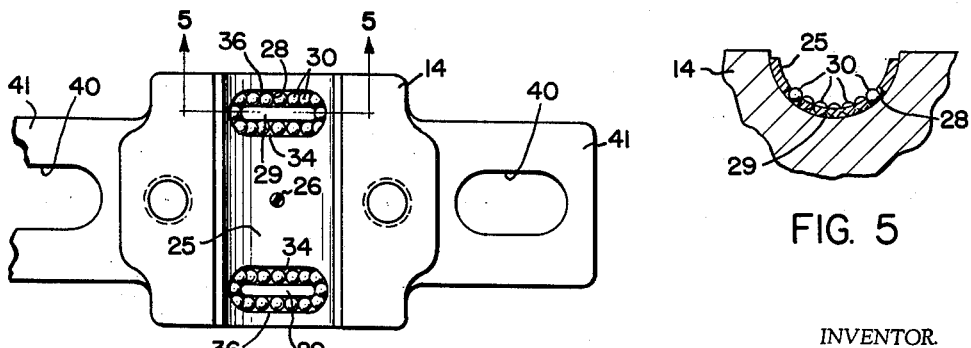
FIG. 4
FIG. 5
INVENTOR.
MAXWELL R. KARGE, JR.
BY *Thomson & Schouer*
ATTORNEYS

3,192,001
BEARING ASSEMBLY
Maxwell R. Karge, Jr., Brockport, N.Y., assignor of twelve and one-half percent to Winslow E. Thomson and twelve and one-half percent to John R. Schovee
Filed Oct. 24, 1962, Ser. No. 232,801
3 Claims. (Cl. 308—185)

This invention relates to bearing assemblies for relative rotational members and more particularly to improvements in roller bearing assemblies of this nature.

One object of my invention is the improvement of roller bearing constructions of the above described nature.

It is a further object of my invention to provide bearing assembly of the above described nature in which the period of minimizing time for replacement is extended.

It is another object of my invention to provide less expensively manufactured and more simply assembled roller bearing constructions of the above described nature.

It is a significant object of my invention to provide an improved construction for roller bearing assemblies of the above described nature which are subject to simple and easy replacement of worn bearings.

It is another additional important object of my invention to provide a roller bearing construction of the above described nature having a simple radial adjustment to compensate for wear of the roller members.

Other objects and advantages of this invention will be particularly set forth in the claims and will be apparent from the following description, when taken in connection with the accompanying drawings, in which:

FIG. 1 is an end elevational view of one embodiment of my invention with parts broken away;

FIG. 2 is a side elevational view of the embodiment illustrated in FIG. 1 partly in section taken along the line 2—2 of FIG. 1 looking in the direction indicated by the arrows;

FIG. 3 is an enlarged second embodiment of the circled portion of FIG. 2.

FIG. 4 is a top planar view taken along the line 4—4 of FIG. 1, looking in the direction indicated by the arrows;

FIG. 5 is a partial sectional view taken along the lines 5—5 of FIG. 4, looking in the direction indicated by the arrows.

In order to fulfill the above objects, I provide a pair of cooperative rotational members with radial, substantially coaxial recirculating roller bearing means intermediate the members.

Recirculating ball bearing means per se are old in the art as applied to rectilinear relative movement between two reciprocating members. However, to my knowledge there has never been devised a radial recirculating endless race with roller bearings carried therein to provide relative rotary or rotational movement between concentric members of a roller bearing assembly.

As shown in the figures, my bearing assembly comprises, an inner cylindrical rod or shaft 10; a pair of cooperative outer bearing housing or race members 12 and 14 embracing the shaft 10; and a pair of radial recirculating roller bearing means generally indicated by the numerals 16 and 18 respectively mounted intermediate the split bearing housing, comprising the pair of outer members 12 and 14.

As used hereinafter, the term "recirculating roller bearing means" refers to an endless roller bearing race carrying a plurality of roller bearing elements providing cooperative bearing surfaces, between the shaft 10 and outer housing members which extend along only a portion of the endless race. "Radial recirculating roller bearing means" refers to a bearing means of the above described nature which provides an arcuate bearing surface extending radially of the inner shaft 10. As used hereinafter, the word "coaxial" refers to the bearing surface of the radial recirculating roller bearing means lying in a single plane normal to the rotational axis of the shaft 10, the coaxial plane being indicated by the broken line 20 of FIG. 2. As used hereinafter the phrase "linearly disposed" refers to the plane of the race extending parallel to and linearly of the shaft 10.

Each of the outer housing members 12 and 14 has a longitudinally or linearly extending arcuate groove 22 cooperatively defining a circular longitudinal or linear bore when the housing members are secured together in the manner illustrated in FIG. 1 by a pair of through bolts or screws 24 each having a plastic pellet 23. These bolts are marketed under the trademark "Nylok." The plastic pellet locks the bolt in adjusted position, thereby permitting radial adjustment of the housing members. It will be understood that any type of adjustable locking bolts may be used to fulfill this end. Each arcuate groove 22 is provided with a concentric arcuate liner 25 of selected hard metal rigidly secured thereto, as for example, by screws 26 or braising. As viewed, in FIGS. 2 and 4, liners 25 are each provided with a radially extending oblong, endless slot or race 28 surrounding an oblong island 29, thereby providing an endless ball bearing or roller bearing race in which roller bearing members 38 may be recirculated.

In the embodiment illustrated in FIGS. 1, 2, 4 and 5, I provide the shaft 10 with a circumferential recessed or chamfered portion 32. Recessed portion 32 permits the ball bearings 38 traveling in an inner radially extending portion 34 of each slot 28 to move freely and frictionless as the ball bearings traveling in an outer radial portion 36 of each of the slots 28 provide a radial bearing surface between a larger diameter portion 37 of shaft 10 and the groove 22 of outer housing members 12 and 14. Thus, as the shaft 10 is rotated in the direction indicated by the arrow 38 of FIG. 2, the ball bearings 30 recirculate in the same direction as indicated by the arrows 42 and 43 of FIG. 2.

The outer housing members 12 and 14 are held in stationary positions by bolts not shown extending through slots 40 of lateral flanges 41 of the lower member 14.

In order to prevent linear or sliding movement of the shaft 10 relative to the outer housing members 12 and 14, I provide two collar members 44 and 45 having conventional locking means for locking or keying the collars to the shaft 10. It will be understood that collars 44 and 45 provide protection to the bearings against dust or abrasives.

Although not essential to the concept of my invention, I provide a vertical hole or bore 46 extending through the upper housing member 12 to provide access for oil or other lubricant for the roller bearings 30. A fitting 47 is provided at the top.

In FIG. 3, I have illustrated a second and preferred embodiment of my invention in which I have designated corresponding parts of the other figures with the same numerals followed by the suffix "A." It will be noted that, in this preferred embodiment, the relief in the shaft 10 is supplanted by a recess or groove 48 provided in the outer housing member 12A along the inner radial portion 34A of the endless slot 28. This eliminates the necessity of machining down the relief portion 32 of each shaft used in the assembly. Thus, in the second and preferred embodiment of FIG. 3, the shaft 10A has a continuous outside wall of equal diameter.

I provide a radial space or gap 50 intermediate the outer housing members 12 and 14 when assembled, thereby permitting radial adjustment of housing members to compensate for wear of the bearings. It will be understood that a compressible shim may be provided in the openings 50 in order to seal the assembly against dust and abrasives entering the bearing area.

My split housing construction provides an improved and simplified construction for replacement of worn roller bearings. The upper housing member 12 is simply removed by backing off the through bolt 24; after separation of the housing members 12 and 14, the rollers 30 are removed from the slot 28 and new rollers are placed therein with heavy grease, preferably with a silicate base, for retaining the rollers in the slot race while the upper housing 12 is secured in the operational position of FIG. 1.

The linearly or longitudinally disposed races lying in a plane parallel to the outside diameter of the shaft 10 greatly facilitates the replacement of worn roller bearings.

Unlike prior known radial bearing assemblies, my invention provides double the wear time between ball bearing replacement intervals because of the endless circuit of balls extending radially around substantially the complete circumference of the shaft 10. Additionally, the adjustable feature of the split housing, to compensate for wear, adds to the length of intervals between replacement of balls.

It will be understood that I provide pairs of linearly spaced radial recirculating roller bearing means 16 and 18 in order to provide two bearing surfaces axially spaced of the shaft 10 for alignment thereof.

My invention as described in regard with the above delineated embodiment provides a substantial advancement of the art in radial bearing assemblies.

While I have shown and described the preferred form of mechanism of my invention it will be apparent that various modifications and changes may be made therein, particularly in the form and relation of parts, without departing from the spirit of my invention as set forth in the appended claims.

I claim:
1. A radial bearing assembly comprising,
 (a) an inner member having a cylindrical portion,
 (b) a plurality of cooperative outer members rotatably embracing said cylindrical portion,
 (c) radial substantially coaxial recirculating anti-friction bearing means mounted on each of said outer members intermediate said inner and said outer members, and
 (d) means intermediate said outer members for radial adjustment of said outer members relative to each other.

2. A radial bearing assembly comprising:
 (a) a cylindrical inner member having a reduced in cross-section cylindrical portion;
 (b) a pair of cooperative outer members rotatably embracing said cylindrical member and said reduced in cross-sectional portion thereof;
 (c) an endless radial linearly disposed substantially coaxial recirculating anti-friction bearing race in each of said outer members having a first coaxial portion arranged to embrace said reduced in cross-section cylindrical portion of said inner member and having a second coaxial portion arranged to embrace an unreduced portion of said inner member; and
 (d) anti-friction means in free rolling recirculating relationship in said race, said anti-friction means in said second coaxial portion of said race providing radial bearing surfaces between the inner and each of the outer members.

3. A bearing assembly in accordance with claim 2 including:
 (e) means intermediate said outer members for radial adjustment of said outer members relative to each other.

References Cited by the Examiner
UNITED STATES PATENTS

| | | | |
|---|---|---|---|
| 253,679 | 2/82 | Bussing | 308—185 X |
| 553,588 | 1/96 | Meyer | 308—185 |
| 667,684 | 2/01 | Deharde | 308—185 |
| 1,491,721 | 4/24 | Munson | 308—179 |
| 2,473,307 | 6/49 | Seipt et al. | 308—244 |
| 2,516,486 | 7/50 | Schlicksupp. | |
| 2,838,349 | 6/58 | Maas | 308—123 |
| 3,010,503 | 11/61 | Beuter | 151—7 |
| 3,037,821 | 6/62 | Schutz. | |
| 3,093,177 | 6/63 | Villo | 151—7 |

ROBERT C. RIORDON, *Primary Examiner.*

FRANK SUSKO, *Examiner.*